United States Patent [19]

West

[11] Patent Number: 4,766,168

[45] Date of Patent: Aug. 23, 1988

[54] STABILIZED POLYACETAL COMPOSITIONS

[75] Inventor: Norman E. West, Vienna, W. Va.

[73] Assignee: E. I. Du Pont de Nemours and Company, Wilmington, Del.

[21] Appl. No.: 20,084

[22] Filed: Feb. 27, 1987

Related U.S. Application Data

[63] Continuation-in-part of Ser. No. 853,287, Apr. 15, 1986, abandoned.

[51] Int. Cl.$^4$ .......................... C08K 5/05; C08K 5/10; C08L 59/00; C08L 59/02
[52] U.S. Cl. .................................... 524/377; 524/386; 524/387; 525/58; 525/162; 525/401
[58] Field of Search .................. 524/377, 386, 387; 525/162, 58, 401

[56] References Cited

U.S. PATENT DOCUMENTS

| | | | |
|---|---|---|---|
| 2,993,025 | 7/1961 | Alsup et al. | 260/42 |
| 3,027,352 | 3/1962 | Walling et al. | 260/67 |
| 3,310,608 | 3/1967 | Matsubayashi et al. | 260/897 |
| 3,322,740 | 5/1967 | Kiff et al. | 260/88.3 |
| 3,406,129 | 10/1968 | Price | 260/13 |
| 3,406,130 | 10/1968 | Neff | 260/13 |
| 3,459,789 | 8/1969 | Muller et al. | 260/482 |
| 3,743,614 | 7/1973 | Wolters | 260/18 R |
| 3,787,353 | 1/1974 | Ishii et al. | 260/45.9 P |
| 3,960,984 | 6/1976 | Kohan | 260/857 F |
| 4,098,843 | 7/1978 | Johnson | 260/857 F |
| 4,274,986 | 6/1981 | Ikenaga et al. | 524/910 |
| 4,351,916 | 9/1982 | Kohan | 524/377 |
| 4,555,357 | 11/1985 | Kausga | 252/513 |
| 4,559,380 | 12/1985 | Kasuga et al. | 524/377 |
| 4,596,847 | 6/1986 | Kasuga et al. | 524/377 |

FOREIGN PATENT DOCUMENTS

| | | |
|---|---|---|
| 61345 | 4/1968 | German Democratic Rep. |
| 2266968 | 9/1968 | Japan . |
| 4805175 | 2/1975 | Japan . |

*Primary Examiner*—Veronica P. Hoke

[57] ABSTRACT

Incorporation of 0.1–10 weight percent of certain hydroxy containing polymers and/or oligomers into polyacetal molding compositions results in improved thermal stability of such compositions.

19 Claims, No Drawings

STABILIZED POLYACETAL COMPOSITIONS

CROSS REFERENCE TO RELATED APPLICATION

This application is a continuation-in-part of U.S. application Ser. No. 853,287, filed Apr. 15, 1986 now abandoned.

TECHNICAL FIELD

This invention relates to certain polyacetal compositions which are characterized by improved stability and processing. Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high molecular weight, i.e. 10,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished articles made from such compositions possess desirable physical properties, including high stiffness, strength, low coefficient of friction and good solvent resistance. However, in certain applications, it would be desirable to have greater stability than has heretofore been possible with conventional polyacetal compositions.

BACKGROUND ART

U.S. Pat. No. 2,993,025, granted July 18, 1961 to Alsup et al; U.S. Pat. No. 3,027,352, granted Mar. 27, 1962 to Walling et al; U.S. Pat. No. 3,459,789, granted Aug. 5, 1969 to Muller et al; U.S. Pat. No. 3,743,614, granted July 3, 1973 to Wolters et al; U.S. Pat. No. 3,787,353, granted Jan. 22, 1974 to Ishii et al; U.S. Pat. No. 3,960,984, granted June 1, 1976 to Kohan; U.S. Pat. No. 4,098,843, granted July 4, 1978 to Johnson; Japanese Patent Publication No. 22669/68, published Sept. 30, 1968; and Japanese Patent Publication No. 48051/75, published in 1975; all disclose various polyacetal compositions, both those based on homopolymers and those based on copolymers, and various techniques for stabilizing such compositions. Alsup discloses stabilization of polyacetal compositions by blending therewith a synthetic polyamide. Walling discloses that the thermal stability of certain polyacetal copolymer compositions is improved as compared with corresponding homopolymer. Muller discloses the use of certain monomeric urethane methylol ethers containing free hydroxyl groups as stabilizers for polyacetals. Wolters discloses stabilization of polyacetal compositions by blending therewith a combination of an alkaline earth metal compound and a monomeric ester of an (alkylhydroxylphenyl)-carboxylic acid with a polyol. Ishii discloses stabilization of polyacetal compositions by blending therewith a compound of the formula R(NHCOCH$_2$X)$_n$ where R is a hydrocarbon group, X is a cyano or carbamoyl group, and n is 2–6. Kohan discloses stabilization of polyacetal compositions by blending therewith an amide oligomer. Johnson discloses stabilization of polyacetal compositions by blending therewith a dispersion of polyamide in a carrier resin. Japanese No. 22669 discloses stabilization of polyacetal compositions with ethylene-vinyl acetate copolymer and Japanese No. 48051 discloses stabilization of polyacetal compositions with epichlorohydrin polymers and metal soap, epoxy compounds or organic phosphites.

While each of the references discussed above disclose various means for improving the stability of polyacetal compositions, none disclose the stabilization system used in the compositions of the present invention.

U.S. Pat. No. 3,310,608, granted Mar. 21, 1967 to Matsubayashi et al. discloses polyacetal honopolymer compositions which have been modified to improve dyeability and transparency by melt blending therewith, among other things, vinyl alcohol polymers. None of the Examples use purified hydroxy containing polymer or oligomer and none of the Examples use hydroxy containing polymer or oligomer in the amounts used in the present invention.

U.S. Pat. No. 3,322,740, granted May 30, 1967 to Kiff et al. discloses acetal resins, which are not "polyacetals" as that term is used in describing the present invention, which resins are modified to improve impact strength by incorporation into such resins of an alkylene oxide-polyol polyether, in amounts of from about 10 to about 50 percent.

U.S. Pat. Nos. 3,406,129 and 3,406,130, granted Oct. 15, 1968 to Price and Neff, respectively, disclose melt blends of cellulose polymer having free hydroxyl groups with up to 50% of acetal polymer and colloidal dispersions of such blends with certain solvents for the cellulose polymer, which compositions are alleged to have improved melt strength and elongation.

U.S. Pat. No. 4,555,357, granted Nov. 26, 1985 to Kausga et al. discloses polyacetal resin compositions containing 0.1–15 weight percent of an amide of the formula

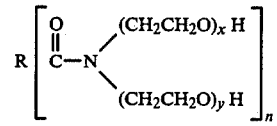

where R is carboxylic acid residue, x and y are 0–10 and n is 1–6. None of the Examples disclose compounds of the above formula which are polymeric or oligomeric.

East German Patent No. 61,345, published Apr. 4, 1968, discloses polyacetal compositions modified with 1–15 weight percent of trimethylol propane as a plasticizer to impart increased resistance to breakage by bending.

None of the references discussed immediately above deal with stabilization of polyacetal compositions, and while some disclose incorporating hydroxy-containing polymers into polyacetal compositions, none disclose the particular hydroxy containing polymers used in the compositions of the present invention, or the unexpected improved stability resulting therefrom.

DISCLOSURE OF THE INVENTION

This invention relates to certain polyacetal compositions which are characterized by improved stability. The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

It has been found that polyacetals can be formulated into compositions having improved stability. More specifically, when polyacetals are melt compounded with certain hydroxy containing polymers, the resulting compositions are characterized by improved stability as measured by lower evolution of formaldehyde, improved color retention, reduced contamination, reduced mold deposit and improved melt stability.

Typical commercially available polyacetal compositions are stabilized with polyamide (such as disclosed in Alsup et al, U.S. Pat. No. 2,993,025). Polyamides can react with formaldehyde released during processing, resulting in the reaction products and/or decomposition products contaminating the molded article. The hydroxy containing polymers used in the compositions of the present invention do not degrade or form contamination as readily as the conventional nylon stabilizers. In addition, they provide improved stability of the polyacetal when subjected to long heating times.

The polyacetals used in the compositions of the present invention can be branched or linear and will generally have a number average molecular weight in the range of 10,000 to 100,000, preferably 20,000 to 70,000. The molecular weight can conveniently be measured by gel permeation chromatography in m-cresol at 160° C. using a Du Pont PSM bimodal column kit with nominal pore size of 60 and 1000Å. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

The hydroxy containing polymer used in the compositions of the present invention is a polymer or oligomer wherein the atoms in the backbone to which the hydroxy groups are attached, either directly or indirectly are separated from each other (i.e. connected to each other) by not more than twenty chain atoms. Preferably, the hydroxy containing polymer or oligomer will contain on average at least one hydroxy group per each twenty carbon atoms in the backbone of the polymer or oligomer and not more than one hydroxy group per carbon atom in the backbone. More preferably, the ratio of hydroxy groups to carbon atoms in the backbone will be 1:2-1:10, and most preferably 1:2-1:5.

Specific preferred hydroxy containing polymers include poly(vinyl alcohol), poly(ethylene vinyl alcohol), hydroxyesters of poly(meth)acrylates, such as poly(hydroxypropyl methacrylate) or poly(hydroxyethyl methacrylate), and vinyl alcohol/methylmethacrylate copolymers.

To achieve the improvements mentioned above, i.e., lower evolution of formaldehyde, improved color retention, reduced contamination, reduced mold deposit and improved melt stability, the hydroxy containing polymer or oligomer will be present in the compositions of the present invention in the amount of 0.1 to 10 weight percent based on the amount of polyacetal, preferably 0.2-4.0 weight percent and most preferably 0.6-2.5 weight percent. Lower amounts of hydroxy containing polymer can also be used, e.g., as little as 0.005 weight percent, and although the improvements mentioned above may not be realized, use of hydroxy containing polymer having the requisite purity, as discussed below, will prevent destabilization of the polyacetal.

It is important that the hydroxy containing polymer or oligomer used in the compositions of the present invention be substantially free of compounds which destabilize acetal resins. Compounds likely to occur in significant quantities in commercially available hydroxy containing polymers or oligomers useful in the compositions of the present invention include nonvolatile ash of a basic character and acidic materials.

Typically, commercially available polyvinyl alcohol is made by a base catalyzed methanolysis of polyvinyl acetate, which results in the formation of by-product sodium acetate. In stabilizing polyacetal homopolymer, this, and other alkali or alkali earth acetates or such salts of other organic acids should be removed to less than 40 ppm, preferably less than about 10 ppm. Of course, it is understood that basic materials, even if volatile, can destabilize polyacetal homopolymer resins and accordingly should, if present, also be removed. In stabilizing polyacetal copolymer, higher concentrations (e.g., >1 weight percent) of basic materials can be tolerated. In addition, it should be understood that if the impurity is only weakly basic, as compared with sodium acetate, relatively higher amounts can be tolerated.

In stabilizing both homopolymer and copolymer polyacetal, acidic impurities in the hydroxy containing polymer or oligomer should be minimized. Typically, commercially available hydroxy containing polymer or oligomer used in the compositions of the present invention may contain acidic salts, such as ferric chloride, zinc chloride or other Lewis acids. While such salts are generally not found in appreciable quantities in poly(vinyl alcohol) or poly(ethylene vinyl alcohol), such salts may be present in some hydroxy containing polymers or oligomers, and should be removed to levels of not more than 40 ppm and preferably to 10 ppm. As with the basic impurities, it should be understood that if the impurity is only weakly acidic, as compared with ferric chloride or zinc chloride, relatively higher amounts can be tolerated.

Accordingly, when such acidic and/or basic impurities are present in amounts greater than the threshhold amounts stated above, the hydroxy containing polymer or oligomer should be purified before it is introduced into the compositions of the present invention. Poly(vinyl alcohol) can be purified by washing with methanol/water solutions. Poly(ethylene vinyl alcohol) can be purified by washing first with water acidified to pH 2-3 with acids, for example, $H_3PO_4$, HCl, or acetic acid, and then with dimineralized water.

The molecular weight of the hydroxy containing stabilizers used in the compositions of the present invention is not critical. As noted above, this material can be oligomeric. Thus, low molecular weight stabilizers are contemplated. Similarly, high molecular weight stabilizers are also contemplated, although for ease of processing and commercial availability, it is generally preferred that the hydroxy containing stabilizer have a molecular weight from 5,000 to 100,000.

It should be understood that the compositions of the present invention can include, in addition to the polyacetal and the hydroxy containing oligomer or polymer, other ingredients, modifiers and additives as are generally used in polyacetal molding resins, includng co-stabilizers (such as those disclosed in U.S. Pat. Nos. 3,960,984 and 4,098,843), anti-oxidants, pigments, colorants, toughening agents, reinforcing agents and fillers. It should also be understood that some pigments and colorants can, themselves, adversely affect the stability of polyacetal compositions.

The compositions of the present invention can be prepared by mixing the hydroxy containing stabilizer with the polyacetal polymer at a temperature above the melting points of these two components of the compositions using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing, such as valves, gates or screws designed for this purpose. Extruders are preferred. Of course, such mixing should be conducted at a temperature below which significant degradation of the components of the composition will occur.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°-260° C., preferably 185°-240° C., most preferably 200°-230° C. When injection molding the compositions of the present invention, it is preferred that the mold be as cold as possible consistent with the intracacy of the shape being produced. Generally, the mold temperature will be 10°-20° C., preferably 10°-100° C., and most preferably about 50°-90° C.

In the following examples, there are shown specific embodiments of the present invention and certain comparisons with embodiments of control experiments outside the limits of the present invention. It will be seen that the compositions of the present invention are characterized by improved stability. All parts and percentages are by weight, and all temperatures are in degrees Celsius unless otherwise specified. Measurements not originally in SI units have been so converted and rounded where appropriate.

In the following examples, three different polyacetals were used:

(a) "polyacetal A" was acetate end-capped homopolymer having a number average molecular weight of about 65,000;

(b) "polyacetal B" was acetate end-capped homopolymer having a number average molecular weight of about 40,000; and (c) "polyacetal C" was commercially available formaldehyde/ethylene oxide copolymer having a molecular weight of about 40,000, stabilized with dicyanodiamide.

In the following examples, four different stabilizers were used:

(a) "PVA" was polyvinyl alcohol purified from 1.5 weight percent to 3 ppm of sodium acetate by stirring in a solution of methanol and water. The polyvinyl alcohol was recovered by filtration and the filter cake was washed with methanol. Solvent was removed from the polyvinyl alcohol by drying in a vacuum oven at 70°-80° C. and 635 mm mercury gage;

(b) "nylon" was a 33/23/43 terpolymer of nylon 66, nylon 6/10 and nylon 6, respectively;

(c) "EVOH" was ethylene/vinyl alcohol copolymer containing 29 weight percent ethylene and 71 weight percent vinyl alcohol, and having an apparent melt viscosity at 210° C. of 9500 P, which was purified by washing at 75° C. for 16 hours using water (pH adjusted to 3 with $H_3PO_4$). The acidic water wash was drained from the washing vessel and the ethylene/vinyl alcohol copolymer was washed at 75° C. for 4 hours with demineralized water, and then dried. Prior to wash, the EVOH typically contains 500 ppm ash, and after purification, the EVOH contains less than 10 ppm ash; and (d) "PHEMA" was poly(hydroxyethyl methacrylate) prepared by polymerization of hydroxyethyl methacrylate using a free radical initiator in an isopropanol solvent to give a polymer having a molecular weight of about 10,000.

In the following examples, three different antioxidants were used:

(a) "antioxidant A" was 2,2'-methylene bis(4-methyl-6-tert-butyl phenol);

(b) "antioxidant B" was hydrocinnamic acid (3,5-di-tert-butyl-4-hydroxy-neopentane-tetraaryl ester); and (c) "antioxidant C" was N,N'-hexamethylene-bis-3-(3,5-di-tert-butyl-4-hydroxyphenyl) priopionamide.

In the preparation and extrusion of compositions (or blends) containing the above-identified ingredients, various machines and conditions were used:

(a) "extrusion A" was conducted on a 2.54 cm Modern Plastics Machinery extruder at a temperature of 200° C., a screw speed of 40 rpm and a head pressure of 1300 psi. The resulting extrudates were quenched in a water bath and cut into pieces 3 mm and 6 mm long;

(b) "extrusion B" was the same as extrusion A except that the screw speed was 50 rpm;

(c) "extrusion C" was conducted on a 5.08 cm Royle extruder using a melt barrier screw at a temperature of 215° C., a screw speed of 60 rpm, and a head pressure of 6.89 MPa;

(d) "extrusion D" was conducted on a 6.35 cm Sterling extruder using a melt barrier screw at a temperature of 200° C. and a screw speed of 80 rpm;

(e) "extrusion E" was the same as extrusion D except the temperature was 195° C. and the screw speed was 45 rpm;

(f) "extrusion F" was the same as extrusion D except that the barrel heater set points were 230° C. and the screw speed was 75 rpm; and (g) "extrusion G" was conducted on a 28 mm twin screw extruder operated at a temperature (exit the die) of 200° C. and at a screw speed of 150 rpm.

In the following examples, thermal stability of the compositions was determined using a thermally evolved formaldehyde (TFE) test procedure. A weighed sample of polyacetal composition was placed in a tube and the tube was fitted with a cap for introduction of nitrogen to the test sample for removal of any evolved gases from the apparatus while maintaining the sample in an oxygen-free environment. The sample was heated at 259° C. in a silicon oil bath. The nitrogen and any evolved gases transported thereby were bubbled through 75 ml of a 40 g/l sodium sulfite in water solution. Any evolved formaldehyde reacts with the sodium sulfite to liberate sodium hydroxide. The sodium hydroxide was continuously neutralized with standard 0.1N HCl. The results were obtained as a chart of ml of titer versus test time. The percent evolved formaldehyde was calculated by the formula $$(V)(N)\left[\frac{0.03 \times 100}{SW}\right]$$

where

V is the volume of titer in milliliters

N is the normality of the titer, and

SW is the sample weight in grams.

The factor "0.03" is the milliequivalent weight of formaldehyde in g/milliequivalent.

Thermal evolved formaldehyde results are conveniently reported for thirty ($TEF_{30}$) and sixty ($TEF_{60}$) minutes heating. $TEF_{60}$ results are especially revealing of the improved long term stability of the compositions of the present invention.

In the following examples, stability of the compositions was also evaluated using a contamination study. In that study, each composition extruded under conditions likely to produce contamination, evidenced as black specks in pellets of natural (uncolored) resin.

In the following examples, stability of the compositions was also evaluated using a Hunter Tristimulus Colorimeter to quantify color of tensile bars molded from such compositions.

Physical properties of the various compositions, except those in Example 8, were measured on test specimens molded in a BOY 50T molding machine. The compositions were melted at 205° C. in the melting section of the molding machine and injected under pressure into molds maintained at a temperature of 93° C. The tensile bars thus molded measured 3.175 mm thick, 12.7 mm wide in the necked down portion and were nominally 21.27 cm long. Flex bars were similarly molded and were 3.175 mm thick, 12.7 mm wide and 12.5 cm long. Tensile strength and elongation were measured using ASTM D-638 procedures; notched izod was measured using ASTM D-256; and flex modulus was measured using D-790.

EXAMPLE 1

Blends of polyacetal A, antioxidant A, purified PVA and nylon were prepared by extrusion A, and were then tested for their $TEF_{30}$ value. The results of those tests along with the composition of each of the blends are given in Table 1, below:

TABLE 1

| Blend | Polyacetal | Antioxidant | PVA | Nylon | $TEF_{30}$ (%) |
|---|---|---|---|---|---|
| 1 | A 454 g | A 0.5 g | 4.5 g | 4.5 g | 0.2 |
| 2 | A 454 g | A 0.5 g | 4.5 g | — | 0.61 |
| 3 | A 454 g | A 0.5 g | — | — | 2.74 |
| 4 | A 454 g | A 0.5 g | — | 4.5 g | 0.51 |

EXAMPLE 2

Blends of polyacetal A, antioxidant B, purified PVA and nylon were prepared by extrusion C, and were then tested for their $TEF_{30}$ and $TEF_{60}$ values. In addition, tensile bars and flex bars were prepared and physical properties were measured as described above. The compositions and results from these experiments are summarized in Table 2, below:

TABLE 2

| Blend | Polyacetal | Antioxidant | PVA | Nylon | $TEF_{30}$ (%) | $TEF_{60}$ (%) |
|---|---|---|---|---|---|---|
| 1 | A 9.07 kg | B 11 g | 91 g | 91 g | 0.18 | >3.8 |
| 2 | A 9.07 kg | B 11 g | 91 g | — | 0.26 | 1.04 |
| 3 | A 4.54 kg | B 5.5 g | — | 46 g | 0.26 | >3.8 |

| Blend | Ten. Str. | Elongation | Flex. Mod. | Notch Izod |
|---|---|---|---|---|
| 1 | 72.4 MPa | 33.3% | 2.72 GPa | 114 J/m |
| 2 | 72.3 MPa | 26.7% | 2.79 GPa | 97 J/m |
| 3 | 68.7 MPa | 71.0% | 2.98 GPa | 125 J/m |

EXAMPLE 3

Blends of polyacetal B, antioxidant B, purified EVOH and nylon were prepared by extrusion D, and were then tested for their $TEF_{30}$ value. In addition, tensile bars and flex bars were prepared and physical properties were measured as described above. The compositions and results from these experiments are given in Table 3, below:

TABLE 3

| Blend | Polyacetal | Antioxidant | EVOH | Nylon | $TEF_{30}$ (%) |
|---|---|---|---|---|---|
| 1 | B 68 kg | B 68 g | 680 g | — | 0.21 |
| 2 | B 68 kg | B 68 g | — | 476 g | 0.44 |

| Blend | Ten. Str. | Elongation | Notched Izod |
|---|---|---|---|
| 1 | 66.4 MPa | 52% | 74.7 J/m |
| 2 | 67.4 MPa | 47% | 68.3 J/m |

EXAMPLE 4

Blends of polyacetal A, antioxidant B, purified EVOH and nylon were prepared by extrusion C and were tested for their $TEF_{30}$ value. The compositions and results of these experiments are given in Table 4, below:

TABLE 4

| Blend | Polyacetal | Antioxidant | EVOH | Nylon | TEF$_{30}$ (%) |
|---|---|---|---|---|---|
| 1 | A 4.54 kg | B 5 g | 45 g | — | 0.19 |
| 2 | A 4.54 kg | B 5 g | — | 45 g | 0.41 |

EXAMPLE 5

Blends of polyacetal A, antioxidants B and C, purified EVOH and nylon were prepared by extrusion C and were tested for their TEF$_{30}$ value. The compositions and results of these experiments are given in Table 5, below:

TABLE 5

| Blend | Polyacetal | Antioxidant | EVOH | Nylon | TEF$_{30}$ (%) |
|---|---|---|---|---|---|
| 1 | A 4.54 kg | B 5 g | — | 45 g | 0.27 |
| 2 | A 4.54 kg | C 5 g | 45 g | — | 0.21 |

EXAMPLE 6

Blends of polyacetal B, antioxidant B, PHEMA and nylon were prepared by extrusion A, and were then tested for their TEF$_{30}$ and TEF$_{60}$ values. The compositions and the results of these experiments are given in Table 6, below:

TABLE 6

| Blend | Polyacetal | Antioxidant | Nylon | PHEMA | TEF$_{30}$ (%) | TEF$_{60}$ (%) |
|---|---|---|---|---|---|---|
| 1 | B 500 g | B 1 g | — | 3.75 g | 0.62 | 1.0 |
| 2 | B 500 g | B 1 g | 3.75 g | — | 0.78 | 3.8 |

EXAMPLE 7

Polyacetal C was used in the experiments of this example. The TEF was measured for this polyacetal
 (a) first, as obtained;
 (b) second, following extraction with ethyl alcohol to remove the dicyanodiamide stabilizer;
 (c) third, following blending of the extracted polyacetal copolymer with purified EVOH and antioxidant B; and
 (d) fourth, following blending of the extracted polyacetal copolymer with unpurified EVOH and antioxidant B.

Blends (c) and (d) were prepared by extrusion B. A summary of the compositions and TEF results is given in Table 7, below:

TABLE 7

| Blend | Polyacetal | Antioxidant | EVOH | TEF$_{30}$ (%) | TEF$_{60}$ (%) |
|---|---|---|---|---|---|
| 1 | (as obtained) | — | — | 0.24 | — |
| 2 | (extracted) | — | — | 4.2 | — |
| 3 | 589 g | B 0.7 g | 6 g | 0.09 | 0.24 |
| 4 | 589 g | B 0.7 g | 6 g* | 0.1 | 0.16 |

*unpurified EVOH

EXAMPLE 8

Blends of polyacetal A, antioxidant B, purified PVA, purified EVOH and nylon were prepared by extrusion E, and were then molded as described below and evaluated for formaldehyde evolved during the molding procedure. The blends were molded into 21.6 cm × 1.3 cm × 0.3 cm tensile bars on an 8 oz. Cincinnati molding machine. The nominal hold-up time during molding was 17.5 minutes at a machine temperature of 229° C. Formaldehyde exposure in the atmosphere over an 8 hour molding period was measured using a "Pro-Tek" badge. A summary of the compositions and exposure results are given in Table 8, below:

TABLE 8

| Blend | Polyacetal | Antioxidant | Nylon | PVA | EVOH | Exposure (ppm CH$_2$O) |
|---|---|---|---|---|---|---|
| 1 | A 89.8 kg | B 91 g | 0.63 kg | — | — | 0.31 |
| 2 | A 89.8 kg | B 91 g | — | 0.91 kg | — | 0.13 |
| 3 | A 89.8 kg | B 91 g | — | — | 0.91 kg | 0.12 |

Mold deposit was evaluated on these three blends using a "top-hat" mold in a 14 oz. HPM molding machine at 237° C. Blend 1 showed paraformaldehyde type mold deposit after molding 200 parts and slight nylon type mold deposit after molding 245 parts. Blends 2 and 3 showed no mold deposit of any type after molding 300 parts.

EXAMPLE 9

Blends of polyacetal A, antioxidant B, purified EVOH and nylon were prepared by extrusion F with a feed rate set to keep the screw covered (flood feed) and a two hole die. Melt temperature exit the die was relatively constant at 252°-254° C. for each blend.

Each blend was run for about two hours and product was collected in lots representing sequential 15 minute segments of each run. To quantify the level of contamination, 5 kg of product was taken from the last lot of each run, the pellets were spread out on a white tray, and all the pellets with visible contamination were picked out, counted and characterized. The compositions and results are summarized in Table 9, below:

TABLE 9

| Blend | Polyacetal | Antioxidant | EVOH | Nylon | Contamination |
|---|---|---|---|---|---|
| 1 | A 67.5 kg | B 68 g | 680 g | — | 2 small black specks |
| 2 | A 67.5 kg | B 68 g | — | 680 g | 34 small black specks 1 large black speck 3 discolored cubes |

In addition, an observation was made of buildup of die drip on the die plate during each run. Blend 1 showed no evidence of die drip. Blend 2 showed substantial acumulation of a brittle black halo around the die hole.

EXAMPLE 10

Blends of polyacetal A, antioxidant B, purified PVA, purified EVOH and nylon were prepared by extrusion E and tensile bars were prepared.

A Hunter Tristimulus Colorimeter was used to quantify the color of the tensile bars. In each case, the tensile bar was cut in half, and the halves were taped together to give sufficient surface area for color measurement.

For each sample, three parameters were measured. "L" is a measure of lightness with 0=black and 100=white. "a" is a measure of red/green balance with positive values indicating a shift toward red and negative values indicating a shift toward green. "b" is a measure of yellow/blue balance with positive values indicating a shift toward yellow and negative values indicating a shift toward blue.

The blend compositions and results of the color evaluation are summarized in Table 10, below:

TABLE 10

| Blend | Polyacetal | Antioxidant | PVA | EVOH | Nylon |
|---|---|---|---|---|---|
| 1 | A 89.8 kg | B 91 g | 0.91 kg | — | — |
| 2 | A 89.8 kg | B 91 g | — | 0.91 kg | — |
| 3 | A 89.8 kg | B 91 g | — | — | 0.63 kg |

| Blend | L | a | b | Description |
|---|---|---|---|---|
| | | Virgin Molding | | |
| 1 | 76.5 | −4.4 | 4.8 | light greenish yellow |
| 2 | 77.3 | −2.0 | 0.3 | off-white |
| 3 | 76.2 | −2.1 | 3.2 | light tan |
| | | 100% Regrind Molding | | |
| 1 | 74.4 | −8.2 | 15.6 | greenish yellow |
| 2 | 76.4 | −4.6 | 5.6 | light greenish yellow |
| 3 | 72.8 | −2.3 | 7.7 | tan |

EXAMPLE 11

Blends of polyacetal B, antioxidant C and EVOH were prepared by extrusion G and were then tested for their $TEF_{30}$ value. The results of these tests along with the composition of each of the blends are given in Table 11, below:

TABLE 11

| Blend | Polyacetal | Antioxidant | EVOH | $TEF_{30}$ (%) |
|---|---|---|---|---|
| 1 | B 2.26 kg | C 4.54 g | — g | 1.75 |
| 2 | B 2.26 kg | C 4.54 g | 1.14 g | 1.25 |
| 3 | B 2.26 kg | C 4.54 g | 2.29 g | 0.80 |
| 4 | B 2.25 kg | C 4.54 g | 11.39 g | 0.68 |
| 5 | B 2.24 kg | C 4.54 g | 22.70 g | 0.50 |
| 6 | B 2.23 kg | C 4.54 g | 34.05 g | 0.36 |
| 7 | B 2.22 kg | C 4.54 g | 45.40 g | 0.41 |
| 8 | B 2.21 kg | C 4.54 g | 56.75 g | 0.43 |
| 9 | B 2.15 kg | C 4.54 g | 113.50 g | 0.39 |
| 10 | B 2.04 kg | C 4.54 g | 227.00 g | 0.38 |

EXAMPLE 12

Blend 1 was prepared by extrusion of 67.3 kg of polyacetal A, 680 g of purified EVOH and 136 g of antioxidant D on a 6.35 cm single screw extruder. Blend 2 was prepared from 67.3 kg of polyacetal A, 475 g of nylon and 136 g of antioxidant D by extrusion under the same conditions and on the same equipment as blend 1.

Thermal stability of these two blends was evaluated by measuring the increase in the melt index of each blend as each blend is held at elevated temperature (240° C.) for extended periods of time. Melt index is the weight in grams of polymer extruded at a given temperature by a given force through an orifice of a given size in a given time, and is inversely related to the molecular weight of the polymer. Thus, the more rapid the increase in melt index, the less effective is the thermal stabilizer.

The values obtained for blends 1 and 2 from 10 to 240 minutes holdup are reported in Table 12. The melt index values reported represent the grams of polymer extruded in 10 minutes at 240° C. through a 2.065 mm orifice by the force of a 3285 g weight on a 55 g, 9.525 mm diameter piston.

TABLE 12

| Holdup Time (min) | M.I. of Blend 1 (g/10 min) | M.I. of Blend 2 (g/10 min) |
|---|---|---|
| 10 | 10.53 | 12.10 |
| 20 | 11.31 | 12.17 |
| 30 | 12.29 | 12.41 |
| 40 | 13.68 | 12.81 |
| 50 | 14.47 | 13.84 |
| 60 | 15.05 | 15.32 |
| 120 | 19.91 | 30.80 |
| 240 | 25.38 | too high to measure |

I claim:

1. A thermoplastic polyacetal composition consisting essentially of
   (a) 0.1–10 weight percent of at least one compound selected from the group consisting of hydroxy containing polymers and hydroxy containing oligomers, and
   (b) 90–99.9 weight percent of at least one polyacetal polymer,
   provided that the above-stated percentages are based on the total amount of components (a) and (b) only, provided further that the atoms in the backbone of the polymer or oligomer to which the hydroxy groups are attached, directly or indirectly, are separated from each other, on average, by not more than twenty chain atoms; and provided further that the hydroxy containing compound is substantially free of acidic materials.

2. The composition of claim 1 wherein the polyacetal is homopolymer and the hydroxy containing polymer or oligomer is substantially free of acidic materials and basic materials.

3. The composition of claim 1 wherein the hydroxy containing compound is substantially free of acid salts and non-volatile ash of a basic character.

4. The composition of claim 1, 2 or 3 wherein component (a) comprises 0.2–4.0 weight percent of the composition.

5. The composition of claim 1, 2 or 3 wherein component (a) comprises 0.6–2.5 weight percent of the composition.

6. The composition of claim 1, 2 or 3 wherein the ratio of hydroxy groups to carbon atoms in the backbone of the polymer or oligomer is in the range 1:1–1:20.

7. The composition of claim 3 wherein the ratio of hydroxy groups to carbon atoms in the backbone of the polymer or oligomer is in the range 1:2–1:20.

8. The composition of claim 1, 2 or 3 wherein the ratio of hydroxy groups to carbon atoms in the backbone of the polymer or oligomer is in the range of 1:2–1:10.

9. The composition of claim 1, 2 or 3 wherein the ratio of hydrocarbon groups to carbon atoms in the backbone of the polymer or oligomer is in the range 1:2–1:5.

10. The composition of claim 1, 2 or 3 wherein component (a) is selected from the group consisting of poly(vinyl alcohol), poly(ethylene vinyl alcohol), poly(hydroxyethyl methacrylate), poly(hydroxypropyl methacrylate), and hydrolyzed vinylacetate/methylmethacrylate copolymer.

11. The composition of claim 1, 2 or 3 wherein component (a) is poly(ethylene vinyl alcohol).

12. The composition of claims 1 or 3 wherein the polyacetal polymer is a copolymer.

13. The composition of claim 12 wherein the hydroxy containing polymer or oligomer contains not more than 40 ppm of acidic materials.

14. The composition of claim 2 wherein component (a) contains not more than 40 ppm of basic materials and not more than 40 ppm of acidic materials.

15. The composition of claim 1, 2 or 3 wherein the polyacetal has a number average molecular weight of 10,000–100,000.

16. The composition of claim 1, 2 or 3 further comprising at least one of co-stabilizers, antioxidants, pigments, colorants, reinforcing agents, toughening agents and fillers.

17. The composition of claim 1, 2 or 3 further comprising a nylon co-stabilizer.

18. Shaped articles made from the composition of claim 1, 2 or 3.

19. A method of preparing the composition of claim 1, 2 or 3 comprising mixing the hydroxy containing compound with the polyacetal polymer at a temperature above the melting points of the components of the composition and below the temperature at which degradation of the components will occur.

* * * * *

UNITED STATES PATENT AND TRADEMARK OFFICE
CERTIFICATE OF CORRECTION

PATENT NO. : 4,766,168

DATED : August 23, 1988

INVENTOR(S) : Norman Eugene West

It is certified that error appears in the above-identified patent and that said Letters Patent is hereby corrected as shown below:

Claim 9, line 53, delete "hydrocarbon" and insert in place thereof -- hydroxy --.

Signed and Sealed this

Fourth Day of September, 1990

Attest:

HARRY F. MANBECK, JR.

*Attesting Officer*       *Commissioner of Patents and Trademarks*